April 11, 1967 C. W. BRUCE 3,313,154

APPARATUS FOR MEASURING ENERGY OUTPUT OF A LASER

Filed July 20, 1964

INVENTOR.
CHARLES W. BRUCE
BY Wade Koontz
Arsen Tashjian
ATTORNEYS

United States Patent Office 3,313,154

Patented Apr. 11, 1967

3,313,154

APPARATUS FOR MEASURING ENERGY OUTPUT OF A LASER

Charles W. Bruce, Richfield Springs, N.Y., assignor to the United States of America as represented by the Secretary of the Air Force.

Filed July 20, 1964, Ser. No. 384,006
3 Claims. (Cl. 73—190)

The invention described herein may be manufactured and used by or for the United States Government for governmental purposes without payment to me of any royalty thereon.

This invention relates to an energy measuring device for determining the total energy output of a laser and is more particularly concerned with providing a calorimeter for accurately measuring the energy generated by a laser by focusing the laser beam into a nearly closed shape, then defocusing the beam and measuring the heat rise in the interior of the close shaped object.

A variety of measuring methods are presently available for determining output power of a high-intensity laser beam. These methods are generally complicated and require extremely specialized equipment and, further, require that the results be interpreted by highly skilled and specially trained personnel. Also, most presently known methods of laser output measurement convert the light energy to electrical energy and measure the converted energy. This latter method may result in inaccuracies because of a lack of spectral response to certain wave lengths of the laser output energy.

The invention herein disclosed measures the total energy output of the laser regardless of whether the spectral band covered by the energy is in the visible or infrared range or both. This is accomplished by determining the laser energy based on the specific heat of a known substance and the time dependent behavior under fixed conditions. Heat measurements are made using sensitive devices such as thermopiles or thermistors in conjunction with a preamplifier and oscilloscope. Thus, although the present invention is simpler to operate, more reliable results are obtainable and more precise readings can be acquired than with any previously available device.

Accordingly, it is an object of the present invention to provide an energy measuring device which is simple and easy to operate while at the same time being reliable and capable of producing more precise readings than any previously known commercially available devices.

Another object of the invention is to provide a device for measuring the total energy output of a laser including a collector element of closed shape configuration fabricated from a material having a known heat capacity for each temperature and positioned so that only a negligible amount of heat is lost while the collector comes to equilibrium.

A further object of the invention is to provide a calorimeter specially suited for measuring laser output including a collecting element for receiving and defocusing the laser beam. The element is suspended in a vacuum to keep heat losses at a minimum.

A still further object of the invention is to provide an energy measuring device for determining the caloric output of a laser wherein the collecting element includes a hollow spherical member having a small off-center opening through which the laser beam is focused into the highly polished interior which quickly defocuses and distributes the laser beam by reflection.

Another still further object of the invention is to provide a calorimeter for measuring the energy output of a laser wherein the temperature sensing devices include arrangement of thermocouples in series or ultra small thermistors.

These and other objects, features and advantages will become more apparent from the following description taken in conjunction with the accompanying drawings wherein.

Figure 1:
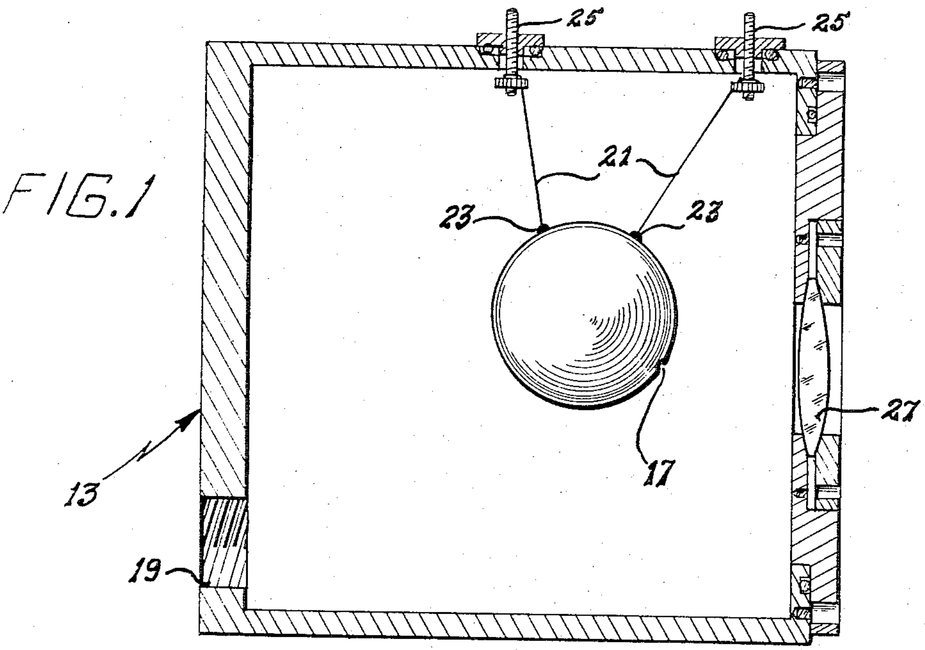
FIGURE1 is a view in partial section of one embodiment of the invention.
Figure 2:
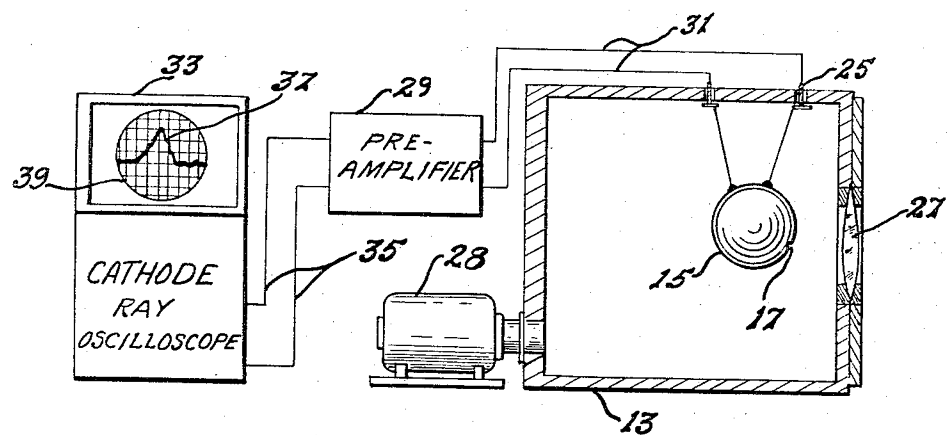
FIGURE 2 is an energy measuring device utilizing the principles of the invention.

Referring now to the drawings, the energy measuring device includes as its principal element a black-body enclosure 13 in which there is suspended a hollow sphere 15. A small opening 17 is positioned off-center in the hollow sphere 15 for receiving the focused energy of the laser beam. The inside walls of the hollow sphere 15 are highly polished and once the laser beam passes through the opening 17, the energy therefrom is quickly defocused and distributed by reflection.

The black-body enclosure 13 is provided with a threaded opening 19 through which the atmosphere therein may be evacuated thereby creating a vacuum in which the sphere 15 is suspended by the thermal insulators 21. This arrangement reduces heat loss to a minimum. A pair fo sensor elements 23 are fixedly attached to the sphere 15 and are provided with leads passing through insulators 21 terminating at terminal members 25. The sensor elements 23 are preferably thermistors which are thermal resistors of ceramic material combined with metals to obtain a definite decrease in resistance as temperature is increased. Because of close tolerance and stability as well as high reliability and unlimited life, thermistors provide an ideal temperature measuring device for obtaining the desired readings.

A lens 27 is located in the front panel of black-body enclosure 13 to allow the laser beam to pass thereinto and through the opening 17 and into the sphere 15. The lens 27 is positioned in an air-tight mount so that the black-body enclosure 13 may be held under vacuum by operation of the vacuum pump 28 during the heat measuring operation. Some of the beam energy will be absorbed by the lens 27 but can be corrected for with an intensity detector which samples the beam although viewing the whole cross-section of the beam. Various intensity measurements are made to determine the energy loss resulting from the passage of the beam through the lens 27 and these measurements are taken into consideration when the final total output of the laser is computed.

The time dependent behavior of energy in the form of heat as collected in the sphere 15 and as measured by the thermistors 23, generate a signal which is fed into the preamplifier 29 through the input leads 31. The output of the preamplifier 29 is connected to the input of a cathode ray oscilloscope 33 through the leads 35 thereby affecting the trace 37 on the cathode ray tube 39. The response of the oscilloscope 33 to the amplified signal fed thereinto through the input 35 is proportional to the amount of energy generated by the laser beam and measured by the thermistors 23. The heat capacity of the sphere 15 is well known at each temperature and the sphere with its thermistor 23 is carefully calibrated. Thus, the specific heats are determined to a high degree of accuracy providing an excellent basis for an absolute measurement.

In operation, the energy measuring device indicates the total energy developed and transmitted by a laser beam. The beam is shuttered and fed into the sphere 15 through the opening 17 after passing through the lens 27. The sphere 15 is suspended by a pair of insulators 21 in an evacuated box 13 and is provided with a highly polished interior surface which serves to quickly defocus and distribute the energy by reflection. A pair of thermistor elements 23 attached to the surface of the sphere 15 react to the temperature change and, since the heat capacity of the material is well known for each temperature of the sphere 15, the signal indicates the time response and behavior of the device which is measured by means of the preamplifier 29 and cathode ray oscilloscope 33. Also, since the hollow sphere 15 is located in the evacuated black-body enclosure 13, only a negligible amount of heat is lost while the sphere 15 comes to equilibrium, allowing the device to be used as a calorimeter to measure the total energy output of the laser.

The polished inside surface of the hollow sphere 15 shows no sign of evaporation of material and no measurable light reflects through the entrance hole 17. Thus, the device provides a high degree of accuracy by trapping all of the generated energy and distributing it in the form of heat in the sphere.

Although only certain embodiments of my invention have been shown and described herein, it will be understood that various modifications in detail may be made in the apparatus by those skilled in the art without departing from the true spirit and scope of the invention as defined in the appended claims.

What is claimed is:

1. An energy measuring device for determining the total energy output of a laser comprising: a black-body enclosure having an opening in the front panel thereof, a hollow sphere suspended in said black-body enclosure, elongated thermal insulators attached between said black-body enclosure top and said hollow sphere for supporting said hollow sphere in a suspended state, said hollow sphere having a small opening off-center thereof in alignment with the opening in said black-body enclosure to receive the laser beam passing therethrough, the inner surface of said hollow sphere being highly polished to reflect and dissipate the laser beam which enters thereinto, sensing means attached to the outer surface of said hollow sphere for determining temperature change thereof, and means for displaying the signal from said sensing means, the temperature change of said hollow sphere shown on said display means being proportional to the total energy output of the laser.

2. The energy measuring device defined in claim 1 wherein a transparent covering of low absorbent material is positioned over the opening in the front panel of said black-body enclosure, said transparent covering attached in such a manner as to produce an air-tight seal thereby preventing the entrance of atmosphere into said black-body enclosure.

3. The energy measuring device defined in claim 2 including a vacuum pump operatively connected to said black-body enclosure for reducing the pressure therein to below atmospheric thereby preventing heat transfer therefrom.

References Cited by the Examiner

UNITED STATES PATENTS

| | | | |
|---|---|---|---|
| 2,811,856 | 11/1957 | Harrison | 73—355 |
| 3,222,522 | 12/1965 | Birkebak. | |

OTHER REFERENCES

Koozekanani, S., et al.: Measurement of the Laser Output, Proceedings of the IRE, 50(2), page 204, February 1962.

RICHARD C. QUEISSER, *Primary Examiner.*

JOHN P. BEAUCHAMP, *Examiner.*